US010362234B2

United States Patent
Jamula et al.

(10) Patent No.: US 10,362,234 B2
(45) Date of Patent: Jul. 23, 2019

(54) CONFIGURABLE SUNSHADE FOR USE WITH MULTIPLE-FIELD-OF-VIEW CAMERA SYSTEM

(71) Applicant: The Charles Stark Draper Laboratory, Inc., Cambridge, MA (US)

(72) Inventors: Matthew T. Jamula, Wilmington, MA (US); Matthew A. Sinclair, Stoneham, MA (US); Benjamin F. Lane, Sherborn, MA (US); Adam Parolin, Somerville, MA (US); Adam Kelsey, Newton, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 15/888,327

(22) Filed: Feb. 5, 2018

(65) Prior Publication Data
US 2018/0227500 A1    Aug. 9, 2018

Related U.S. Application Data

(60) Provisional application No. 62/456,228, filed on Feb. 8, 2017.

(51) Int. Cl.
| | |
|---|---|
| *H04N 5/232* | (2006.01) |
| *H04N 5/225* | (2006.01) |
| *G03B 11/04* | (2006.01) |
| *H04N 5/238* | (2006.01) |
| *G03B 37/04* | (2006.01) |

(52) U.S. Cl.
CPC ....... *H04N 5/23296* (2013.01); *G03B 11/043* (2013.01); *G03B 11/045* (2013.01); *H04N 5/2254* (2013.01); *H04N 5/2258* (2013.01); *H04N 5/238* (2013.01); *G03B 37/04* (2013.01)

(58) Field of Classification Search
CPC .................. H04N 5/23296; G03B 11/043
USPC ............................................. 348/262
See application file for complete search history.

(56) References Cited

U.S. PATENT DOCUMENTS

| | | | |
|---|---|---|---|
| 5,740,480 A | 4/1998 | Kuhn et al. | |
| 7,176,967 B1 * | 2/2007 | Dykaar | H04N 5/2254 |
| | | | 348/262 |
| 2014/0347440 A1 | 11/2014 | Hatcher | |

FOREIGN PATENT DOCUMENTS

EP        2 660 653        11/2013

OTHER PUBLICATIONS

International Searching Authority, International Search Report—International Application No. PCT/US2018/016813, dated Apr. 30, 2018 together with the Written Opinion of the International Searching Authority, 12 pages.

* cited by examiner

*Primary Examiner* — Joel W Fosselman
(74) *Attorney, Agent, or Firm* — Sunstein Kann Murphy & Timbers LLP

(57) ABSTRACT

A configurable sunshade for use with a multiple-camera system that has multiple camera sensors with associated fields of view. The sunshade has multiple portions that are independently rotatable with respect to a fixed platform such that in distinct orientations with respect to each other, specified cameras may be blocked from receiving light from a scene, in whole or in part. In other embodiments, individual apertures of a multi-sunshade housing may be separately activated.

21 Claims, 10 Drawing Sheets

Sending a first control signal from a controller to a motor for rotating the first portion of the sunshade to a desired position for exposing a field of view of one or more cameras, the first portion of the sunshade including open slots and shaded sections to either expose a field of view of at least one camera sensor residing on the fixed frame or for blocking the field of view of at least one camera sensor on the fixed frame
300

Sending a second control signal from a controller to a motor for rotating the second portion of the sunshade to a desired position for exposing a field of view of one or more cameras, the second portion of the sunshade including open slots and shaded sections to either expose a field of view of at least one camera sensor residing on the fixed frame or for blocking the field of view of at least one camera sensor on the fixed frame
320

*FIG. 3*

Disposing a multi-part camera shade adjacent the set of cameras so that at least one camera is aimed toward an interior of the multi-part camera shade, the multi-part camera shade being configured to define apertures by electronic rotation of a first portion of the multi-part camera shade and by electronic rotation of a second portion of the multi-part camera shade such that the apertures defines the selectable portion less than all of the field of view of the at least one camera exposed to the scene
400

Under control of a processor, adjusting the position of the apertures by electronic rotation of the first part and the second part, such that the apertures are oriented toward the scene
420

*FIG. 4* x = a→(0°)
No Open FOV x = b→(+58°)
2 outer & 1 inner x = c→(+90°)
up to 4 outer & 2 inner x = d —>(+180°)
up to 8 outer & 2 inner x = e —>(+270°)
up to 4 outer x = f —>(+325°)
1 outer

CONFIGURABLE SUNSHADE FOR USE WITH MULTIPLE-FIELD-OF-VIEW CAMERA SYSTEM

This application claims priority from U.S. Provisional Patent Application 62/456,228, filed Feb. 8, 2017, which is incorporated herein by reference in its entirety.

TECHNICAL FIELD

The present invention relates to sunshades for altering the field of view of a plurality of camera sensors, and, more particularly, to providing distinct field-of-view configurations for different combinations of a plurality of camera sensors.

BACKGROUND ART

Previous methods of shading the sun (or other ambient light) consist of traditional shutters which close to block light from reaching an imaging sensor, or open to allow the sensor to collect images. Some actively controlled shading or baffling rotate a single opening to allow light into the sensor when it is ready to collect. Presently, there is no known configurable sunshade for use with multiple camera sensors that provides for three or more different configurations to allow different fields of view of the camera sensors.

SUMMARY OF THE EMBODIMENTS

In accordance with one embodiment of the invention, a configurable sunshade is disclosed that is used with a multiple camera system. The multiple camera system includes a fixed platform having a plurality of camera sensors attached thereto, where each sensor has an associated field of view for receiving light from a scene dependent on the configuration of the sunshade.

The sunshade includes a first portion that is independently rotatable relative to the fixed platform and has open slots and shaded sections. The first portion is positioned above the fixed platform. The sunshade includes a second portion layered below the first portion and above the fixed platform. The second portion is independently rotatable relative to first portion, where the second portion has open slots and shaded sections different from that of the first portion. The difference in slots and shaded portions between the first and second portions of the sunshade allows for a wide range of different configurations where different camera sensors may have different fields of view.

In the present embodiment of the invention, the first and second portions are rotatable to a plurality of positions. In a first position of both the first and second portions of the sunshade, all cameras are blocked from receiving light from the scene. In a second position of both the first and second portions of the sunshade, a first set of cameras is blocked from receiving light from the scene. In a third position of the first and second portions of the sunshade, a second set of cameras different from the first set of cameras is blocked from receiving light from the scene. Thus, there are cameras that do receive light in the second and third positions and the field of view is different for each position.

The configurable sunshade may further comprise at least one bearing coupled to the first portion for independently rotating the first portion. Additionally, a second bearing may be coupled to the second portion for independently rotating the second portion. The sunshade system may also include a controller for controlling the independent rotation of the first and second portions. The system may also include a first motor coupled to the first portion capable of independently rotating the first portion in response to the controller. The system may include a second motor coupled to the second portion capable of independently rotating the second portion in response to the controller. The controller may send control signals to the motor for rotating the first and second portions to desired positions.

In certain embodiments of the invention, the first portion is cylindrical having a top and a side and wherein a portion of the open slots and shaded sections reside at least on the side of the cylinder. Additionally, the second portion is cylindrical having a top and a side and wherein a portion of the slots and shaded sections reside on the top of the cylinder. Thus, the first portion is configured to enclose the second portion that resides below the first portion. In certain embodiments, the platform that holds the plurality of camera sensors is circular in shape.

In a first position of the first and second portions of the sunshade, the first and second portions are configured to expose a selectable portion of at least one camera field of view for the scene. In a second position of the first and second portions, the first and second portions are configured to expose a selectable portion of at least one camera field of view different from that in the first position.

The configurable sunshade may also include the platform and the plurality of cameras that reside on the platform.

It should be recognized that when the first portion and second portion of the sunshade are in the first position a first set of cameras will capture a first image and when the first and second portions are arranged in a second position a second set of cameras will capture a second image.

In still yet another embodiment, a method of using a configurable sunshade is disclosed. The configurable sunshade has a first portion and a second portion and the first and second portions residing above a fixed frame that includes a plurality of camera sensors. The second portion resides between the first portion and the fixed platform. A first control signal is sent from a controller to a motor for rotating the first portion of the sunshade to a desired position for exposing a field of view of one or more cameras, the first portion of the sunshade includes open slots and shaded sections to either expose a field of view of at least one camera sensor residing on the fixed frame or for blocking the field of view of at least one camera sensor on the fixed frame. A second control single is sent from the controller to a motor for rotating the second portion of the sunshade to a desired position for exposing a field of view of one or more cameras, the second portion of the sunshade includes open slots and shaded sections to either expose a field of view of at least one camera residing on the fixed frame or for blocking the field of view of at least one camera on the fixed frame.

In this configuration, the exposed field of view of the one or more cameras for the first portion is different from the exposed field of view of one or more cameras for the second portion.

In certain embodiments, the first portion rotates about a first bearing and the second portion rotates about a second bearing. The first portion and the second portion may include a plurality of steps for alignment of the first portion and the second portion.

In certain embodiments of the invention, the fixed frame is circular and has a plurality of camera sensors attached to a top surface.

In an embodiment of the invention, the control signals cause the field of view of all of the cameras to be blocked.

In another embodiment of the invention, a new first control signal is provided and a new second control signal is provided for repositioning the first portion and the second portion relative to the fixed frame and the camera sensors.

In another embodiment of the invention, a method of exposing a selectable portion, less than all of a field of view of a set of cameras to a scene is disclosed. A multi-part camera shade is disposed adjacent the set of cameras so that at least one camera is aimed toward an interior of the multi-part camera shade. The multi-part camera shade is configured to define apertures by electronic rotation of a first portion of the multi-part camera shade and by electronic rotation of a second portion of the multi-part camera shade such that the apertures defines the selectable portion less than all of the field of view of the at least one camera exposed to the scene. In further embodiments of the invention, under control of a processor, the position of the apertures is adjusted by electronic rotation of the first part and the second part, such that the apertures are oriented toward the scene.

BRIEF DESCRIPTION OF THE DRAWINGS

The foregoing features of embodiments will be more readily understood by reference to the following detailed description, taken with reference to the accompanying drawings, in which:

FIG. 3 is a flow chart teaching a method of using the configurable sunshade wherein a first portion of the sunshade is positioned to a desired position and a second portion of the sunshade is also positioned to a desired position through the receipt of control signals to a controller that controls the associated motor and bearings for rotating each portion;

FIG. 4 is a flow chart teaching that a multi-part camera shade is placed adjacent to at least one camera sensor and is controlled by a processor to rotationally reposition the first and second portions of the camera shade;

FIG. 6A shows the sunshade completely closed so that no light reaches the camera sensors;

FIG. 6B shows a new configuration where 2 outer cameras and 1 inner camera are exposed providing a 58 degree field of view for the cameras;

FIG. 6C shows a new configuration where up to 4 outer cameras 605 and 2 inner cameras 606 are exposed providing a 90-degree field of view;

FIG. 6D shows a new configuration where up to 8 outer cameras 610 are exposed which allows a field of view of 180°;

FIG. 6E shows a new configuration where up to 4 outer cameras are exposed;

FIG. 6F shows a new configuration where 1 outer camera sensor is exposed;

DETAILED DESCRIPTION OF SPECIFIC EMBODIMENTS

Definitions

As used in this description and the accompanying claims, the following terms shall have the meanings indicated, unless the context otherwise requires:

The term "slot" or "aperture" shall refer to an opening in the sunshade that allows light to reach the camera sensors. The term "shaded section" refers to a section of the sunshade that blocks light from reaching one or more camera sensors thereby blocking at least of portion of the field of view of the camera sensor. Thus, the plurality of regions of the sunshade have openings that allow in light and shaded sections that block light from reaching the sensors. The configuration of the slots and shaded sections for the camera sensors defines the overall field of view for the camera sensor system.

Figure 1:
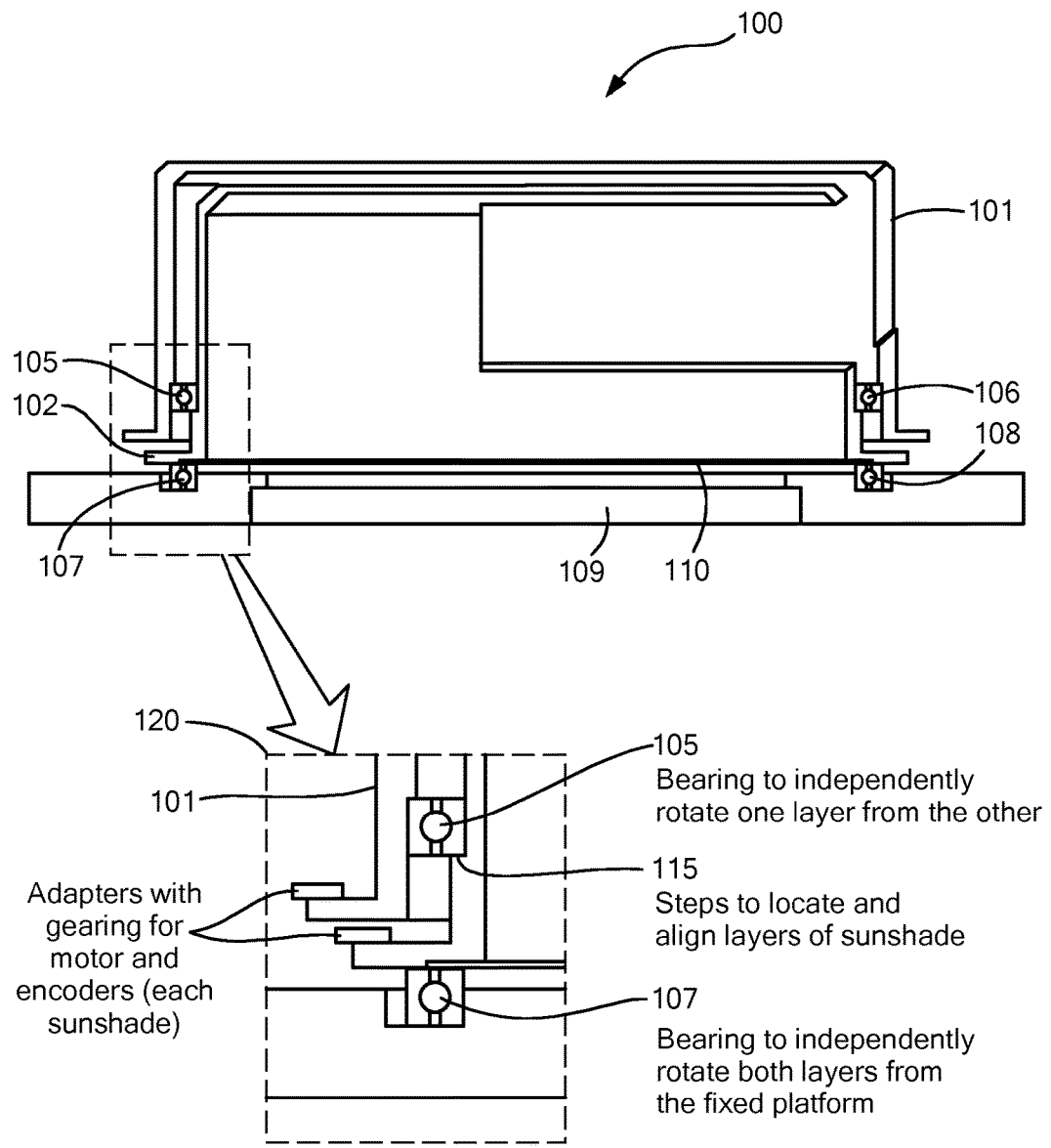
FIG. 1 illustrates a camera sensor array on a platform with a two part reconfigurable sunshade.

FIG. 1 illustrates a camera sensor array on a platform with a two part reconfigurable sunshade, designated generally by numeral 100. In this embodiment of the invention, the sunshade has a first portion 101 and a second portion 102. The two portions are rotatable about bearings 105, 106, 107 and 108. Portions 101 and 102 (also referred to herein as "sunshades") reside above a platform 109 that is preferably a stationary platform and that has camera sensors mounted to its top surface 110. Call-out 120 shows the bearings in greater detail. The bearings are configured to allow the first portion 101 and the second portion 102 of the sunshade 100 to rotate independently. The first portion and second portion include indents or steps 115 for alignment of the first and second portions. As can be seen in the call-out, each portion of the sunshade 100 has its own independent bearing. The sunshade further includes adapters with gearings 120 for coupling to a motor that is controlled by a controller (not shown).

Figure 2:
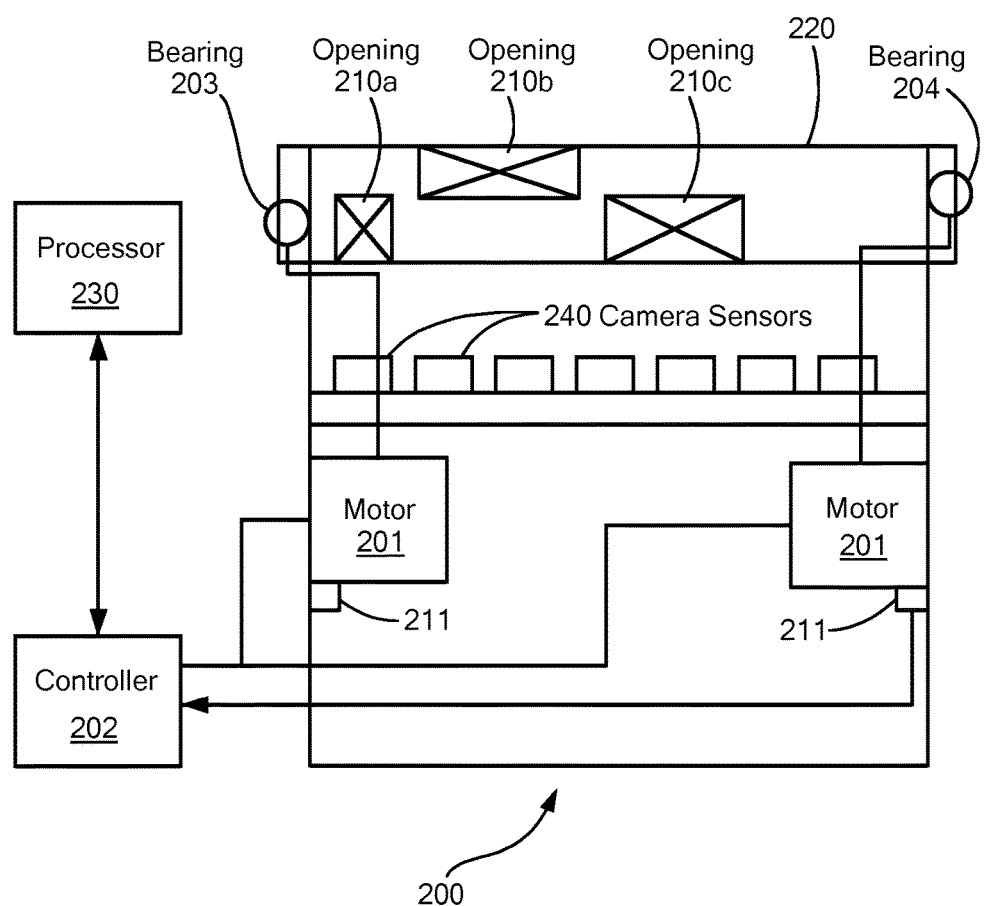
FIG. 2 is a side view of the system showing the motor, controller and bearings for repositioning the open slots and shaded portions of the reconfigurable sunshade allowing the camera sensors to have different fields of view from being totally blocked to having a wide field of view.

FIG. 2 is a side view of the system 200 showing the motor 201, controller 202 and bearings 203, 204 for repositioning the open slots 210a, b, c and shaded portions of the reconfigurable sunshade allowing the camera sensors to have different fields of view from being totally blocked to having a wide field of view (e.g., 90 degrees). The term "wide," as applied to the field of view of a sensor, shall refer to space angles exceeding 90° in at least one dimension.

Each of the first and the second portions of the sunshade have both open and shaded (closed) sections that align with the camera sensors on the fixed platform allowing light to reach the sensors and for the sensors to have a defined field of view. As shown in FIG. 2 there is only a single portion 220 of the sunshade, which is shown for clarity. The positioning of the sunshade portion 220 is controlled by a processor 230 that may be programmed by an individual that wishes to have the sunshades rotated to a particular position forming a particular configuration of the sunshades and provided defined fields of view for a set number of the camera sensors 240. It should be understood that some of the camera sensors 240 will be completely blocked from receiving light and other sensors may have a field of view in most configurations. Additionally, the portions of the sunshade can be configured so that no light reaches any of the camera sensors on the platform as will be explained below with respect to FIG. 6A.

The controller 202 receives instructions from the processor 230 and the controller 202 is designed to work in conjunction with the motors 201 in order to rotate the sunshade about the bearings to a desired position. As the sunshades 220 are rotated by the motors 201 in conjunction with the bearings 203, 204, there are a number of steps/indents that when engaged allow the controller to know the position of the sunshade. For example, there may be 10 separate indentations each identify a different position for a portion of the sunshade. Thus, from a neutral starting point, the controller 202 may receive feedback from feedback sensors 211 (e.g., optical or hall-effect sensors) at the motors 201 indicating that a step has been engaged. Other mechanisms for aligning the sunshade may also be used as would be known to one of ordinary skill in the art.

FIG. 3 is a flow chart teaching a method of using the configurable sunshade wherein a first portion of the sunshade is positioned to a desired position and a second portion of the sunshade is also positioned to a desired position through the receipt of control signals to a controller that controls the associated motor and bearings for rotating each portion.

First, the controller sends a first control signal from the controller to a motor for rotating the first portion of the sunshade to a desired position for exposing a field of view of one or more cameras, step 300 The first portion of the sunshade including open slots and shaded sections to either expose a field of view of at least one camera sensor residing on the fixed frame or for blocking the field of view of at least one camera sensor on the fixed frame.

A second control single is sent from the controller to a motor for rotating the second portion of the sunshade to a desired position for exposing a field of view of one or more camera, step 320 The second portion of the sunshade includes open slots and shaded sections to either expose a field of view of at least one camera residing on the fixed frame or for blocking the field of view of at least one camera on the fixed frame.

Thus by positioning the first and second sunshades at different positions, different fields of view can be created. In some embodiments, the number of different configurations can be in excess of 10. Six variations are shown in FIGS. 6A-6F.

FIG. 4 is a flow chart teaching the configuration and operation of a multi-part camera shade from a first configuration to a second configuration. During operation, a user may desire to change the field of view of the camera sensors by repositioning the first and second portions of the camera sunshade thereby repositioning the openings and shaded sections of the sunshade.

First a multi-part camera shade is positioned adjacent a set of camera sensors so that at least one camera sensor is aimed toward an interior of the multi-part camera shade, step 400. In other embodiments, more than one camera sensor is aimed toward the interior of the multi-part camera shade. The multi-part sunshade may have a 3-dimensional configuration, wherein the sunshade is shaped like a cylinder and has sidewalls and a circular top surface. Thus, the cameras may be directed at the top surface or at the sidewalls of the sunshade.

The multi-part camera shade is configured in a first configuration to define apertures by electronic rotation of a first portion of the multi-part camera shade and by electronic rotation of a second portion of the multi-part camera shade such that the apertures define the selectable portion less than all of the field of view of the at least one camera exposed to the scene.

Based on either user selection or a determination that the field of view and therefore the apertures should be changed, the position of the apertures is adjusted to a second configuration by electronic rotation of the first part and the second part, such that the apertures are oriented toward the scene. The sunshade can be repositioned to have different apertures at different locations of the camera sensors for a plurality of configurations, step 420.

Figures 5A, 5B:
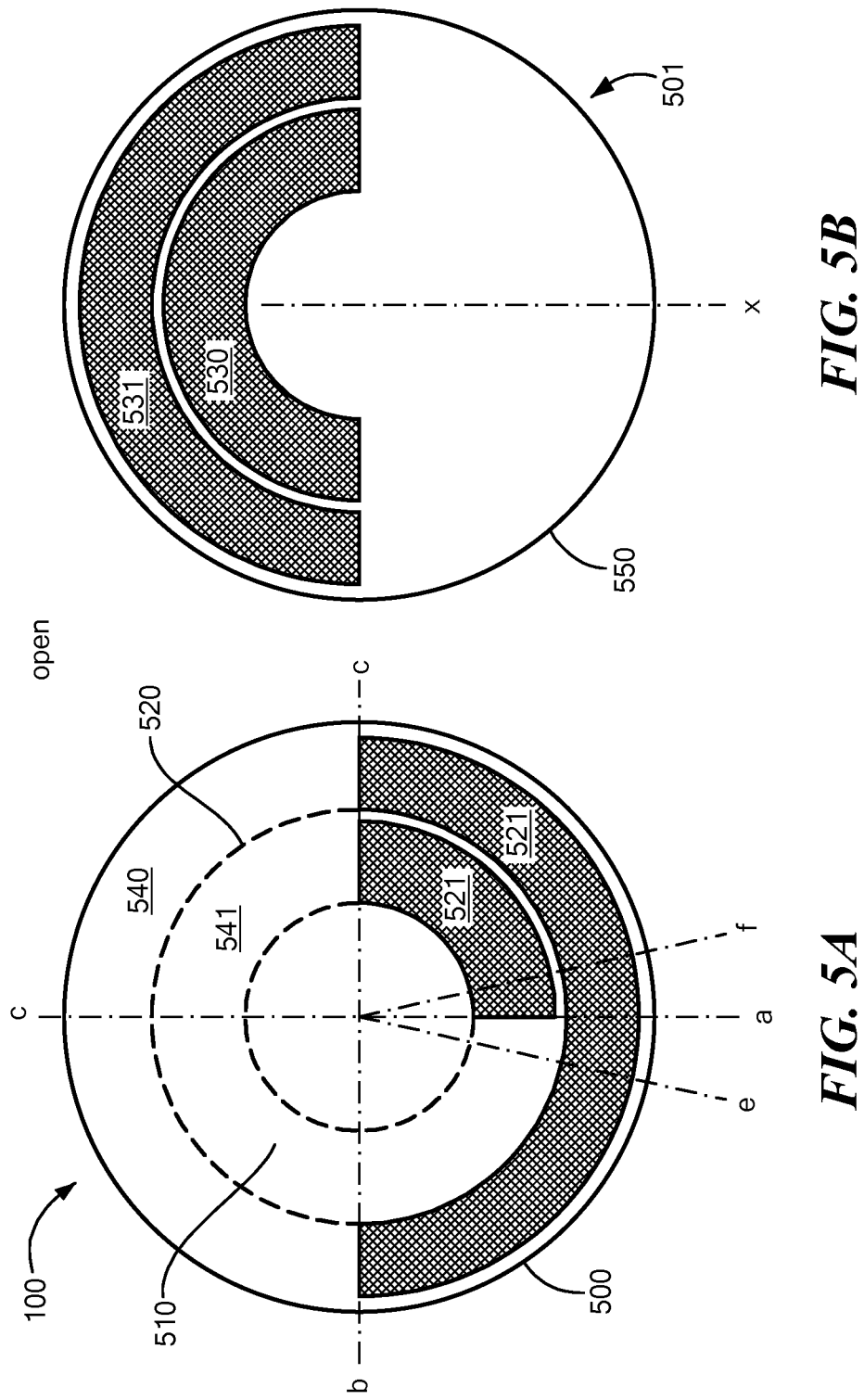
FIGS. 5A and 5B show a two dimensional representation of a first portion and a second portion, respectively, of the sunshade, in accordance with an embodiment of the present invention, where open and closed regions (shaded regions) are designated.

FIGS. 5A and 5B shows a two dimensional representation of a first portion (first circle) 500 in FIG. 5A and a second portion (second circle) 501 in FIG. 5B of the sunshade where open and closed regions (shaded regions) are designated. In FIG. 5A, the open portions include an inner 510 and an outer ring 520 of the circle. The outer ring 521 on the lower half of the sunshade is completely open. The inner ring of the sunshade on the lower half of the sunshade has an opening only over the right quarter of the circle 522 from lines B-D that define the diameter of the circle to the line defined by a-c. For the second portion of the sunshade 501 shown in FIG. 5B, the openings are over the top diameter of the circle, where there is an opening over the entire inner 530 and entire outer 531 rings. These two circles 500 and 501 can be overlaid on top of one another and rotated in position to produce three or more separate configurations providing different openings and therefore, different fields of view for the camera sensors that reside below one of the openings. The two dimensional representation can be configured into a three dimensional representation by folding the outer ring so that it forms the sidewalls of a cylinder as shown in FIGS. 6A-6F.

Figure 6A:
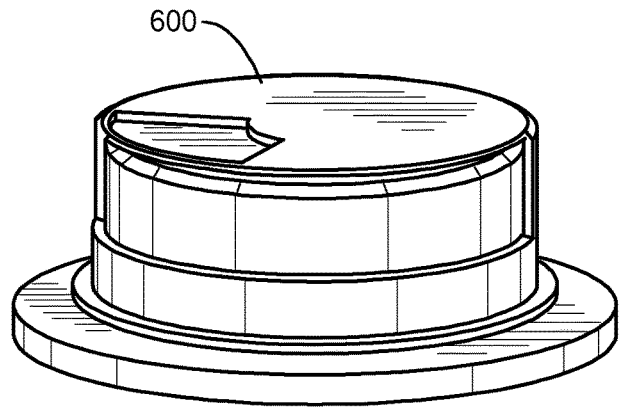
FIGS. 6A-6F show three dimensional views of the sunscreen with the first and second portions of FIG. 4 in different positions, in accordance with embodiments of the present invention.

FIGS. 6A-6F show three-dimensional views of the sunshade 100 (shown in FIGS. 5A and 5B), with the first and second portions of FIGS. 5A and 5B in different positions. As shown the outer rings (520, 531) from FIGS. 5A and 5B are bent down to form the walls of a cylinder. FIG. 6A shows the sunshade 600 completely closed so that no light reaches the camera sensors. This is accomplished by having the circles of FIGS. 5A and 5B overlapping one another such that the shaded section of the first circle 540, 541 covers the top half of the circle blocking all light while the bottom half of the second circle 550 blocks all light at the bottom. Thus, the combination of the first portion and second portion completely blocks out all of the light from reaching the camera sensors at surface 110 (shown in FIG. 1). The notation "x=a" denotes that the x-radial shown in FIG. 5B is aligned with the a-radial shown in FIG. 5A.

Figure 6B:
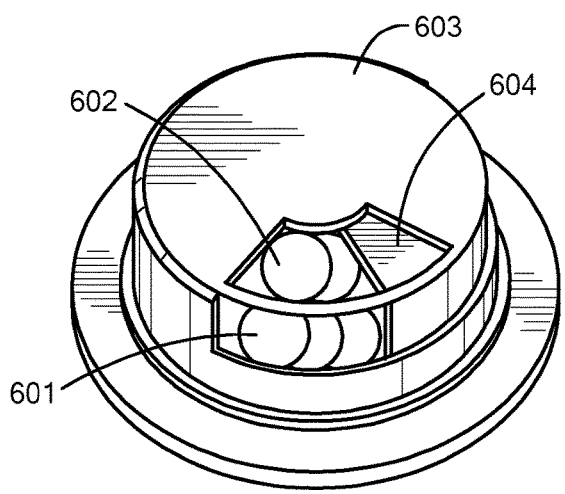

FIG. 6B shows a new configuration where 2 outer cameras 601 and 1 inner camera 602 are exposed providing a 58 degree field of view for the combination of the 3 total cameras. The first portion of the sunshade 603 and the second portion of the sunshade 604 overlap. The field of view comprises the combination of the open sections of the first and the second portions of the sunshade. Thus, for light to reach the camera sensors there must be an opening in both the first and second portions at the location of the camera sensor.

Figure 6C:
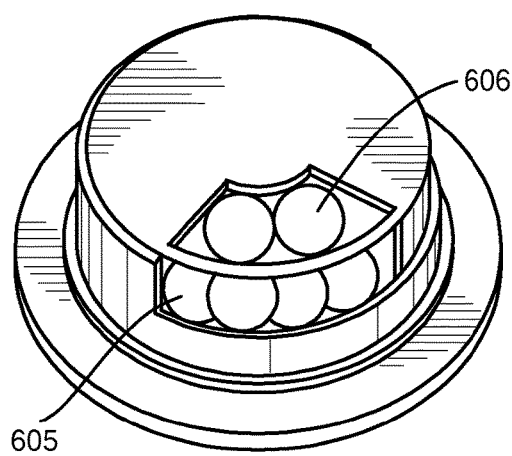
Figure 6D:
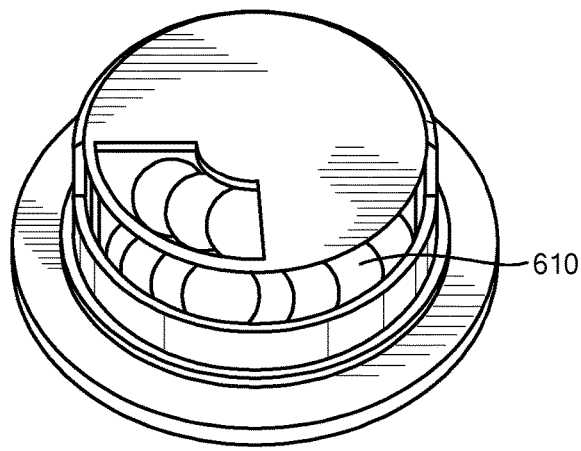
Figure 6E:
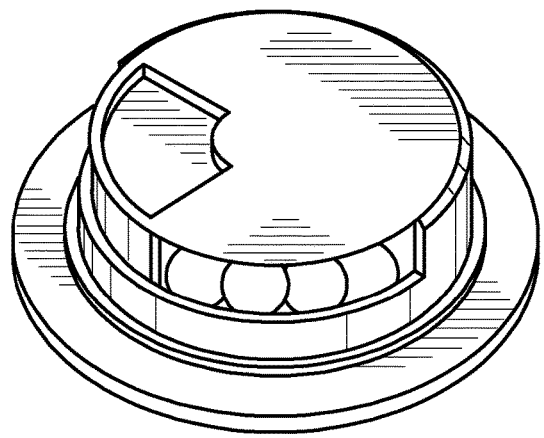
Figure 6F:
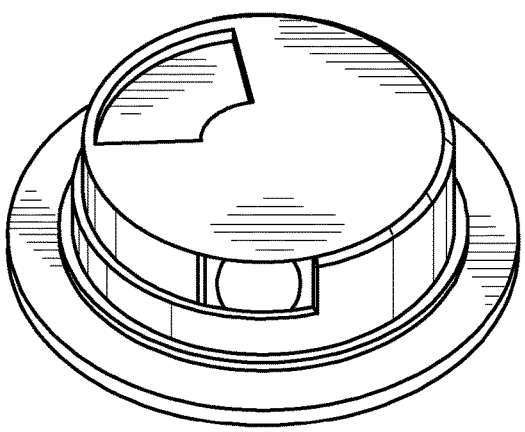

FIG. 6C shows a new configuration where up to 4 outer cameras 605 and 2 inner cameras 606 are exposed providing a 90-degree field of view. FIG. 6D shows a new configuration where up to 8 outer cameras 610 are exposed which allows a field of view of 180°. (Note: The sign of the field of view denotes the relative positions of the inner and outer sunshades.) FIG. 6E shows a new configuration where up to 4 outer cameras are exposed, while FIG. 6F shows a new configuration where 1 outer camera sensor is exposed.

Figure 7A:
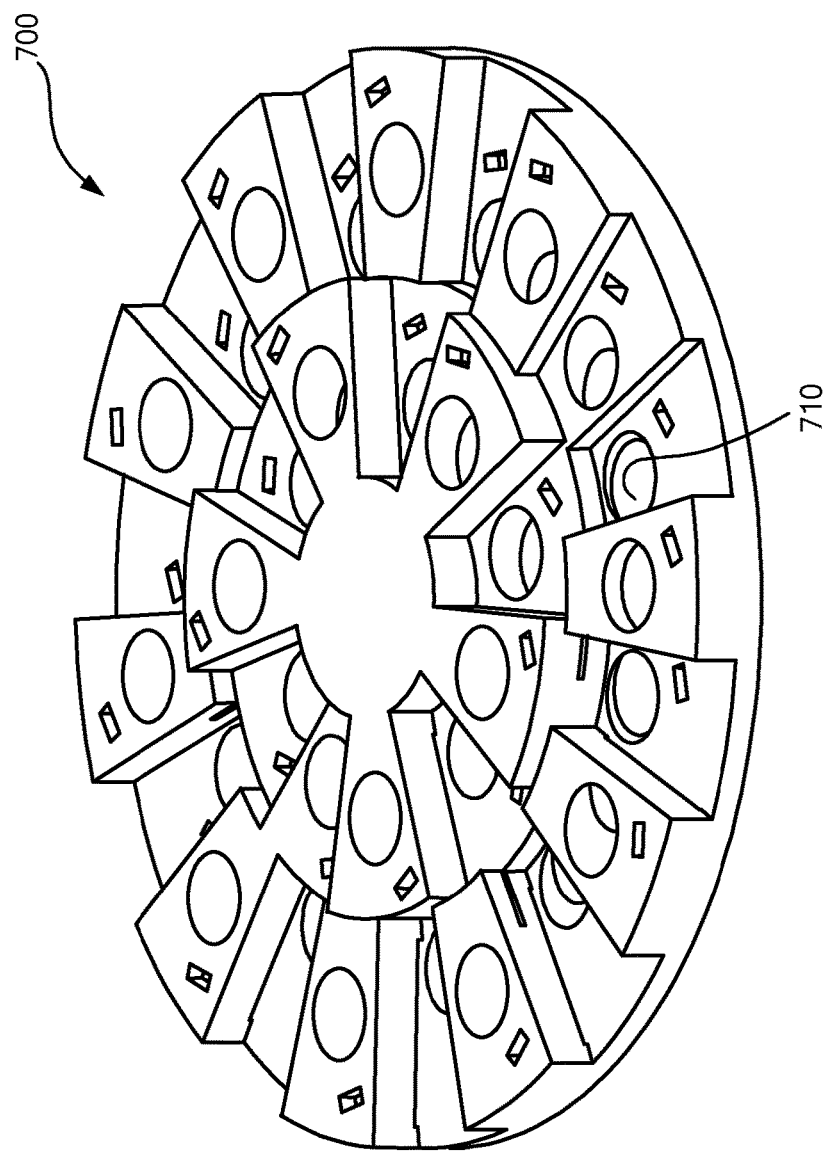
FIG. 7A-7C show three views of an alternative embodiment in which each aperture of the sunshade housing includes its own individual sunshade.
Figure 7C:
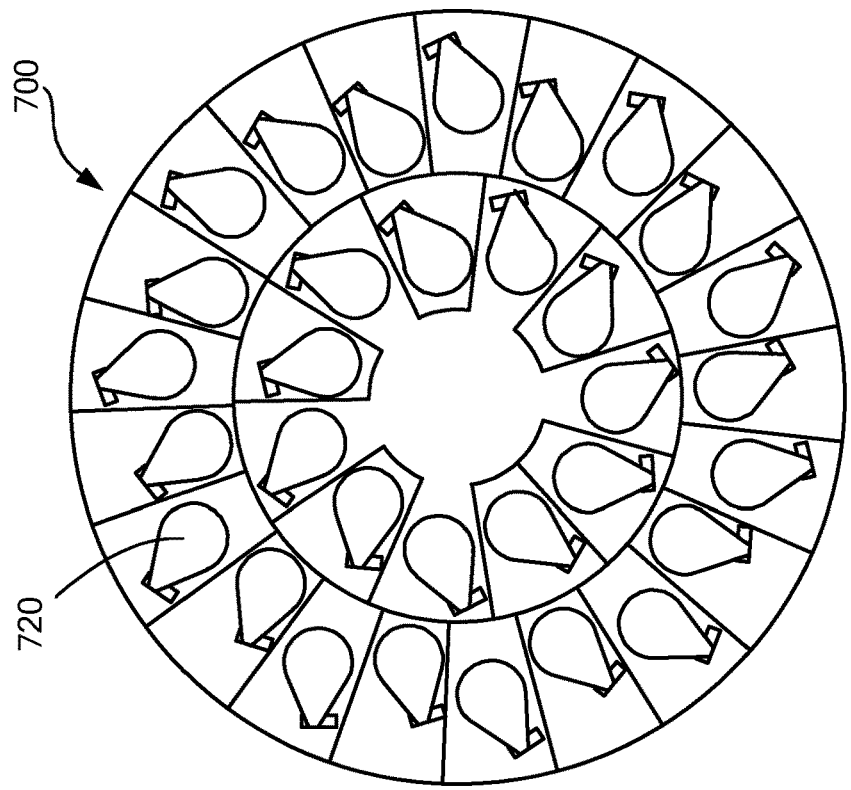
Figure 7B:
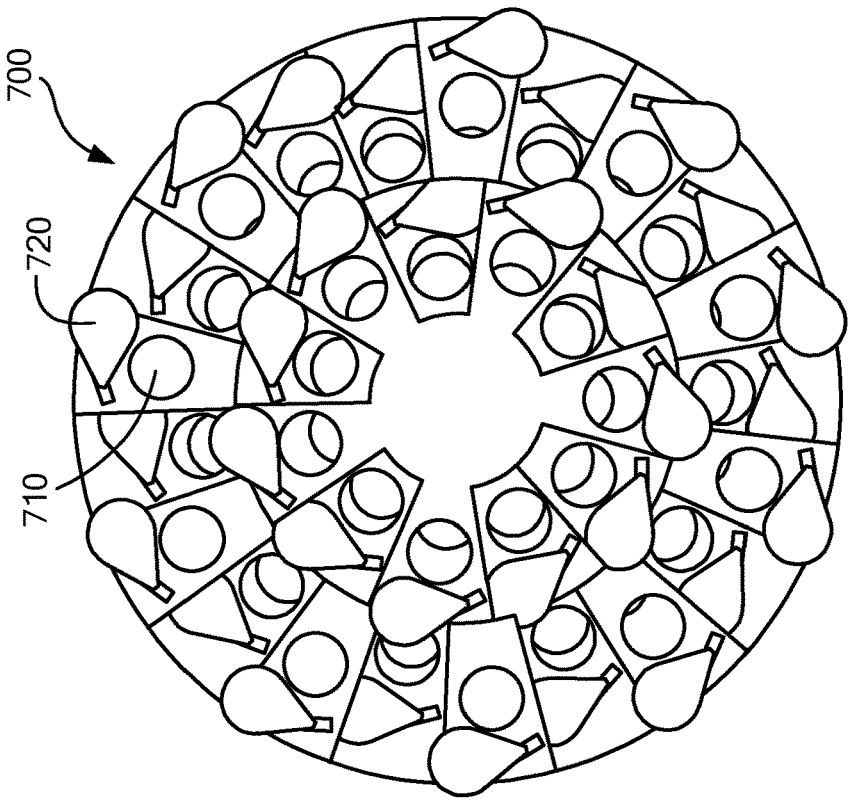

FIGS. 7A-7C show three views of an alternative embodiment 700 in which each aperture 710 of the sunshade housing includes its own individual sunshade 720. Each aperture has its own individually controlled sunshade. The individually controlled sunshades are mounted in a layered pattern such that opening select multiple shudders would allow light to be received by a corresponding sensor. This configuration requires a one to one correspondence between the aperture/sunshade and the camera. In such a configuration, the only moving part is the sunshade for an aperture. There are no separately rotatable or repositionable portions of the sunshade itself as in prior embodiments.

Figure 8A:
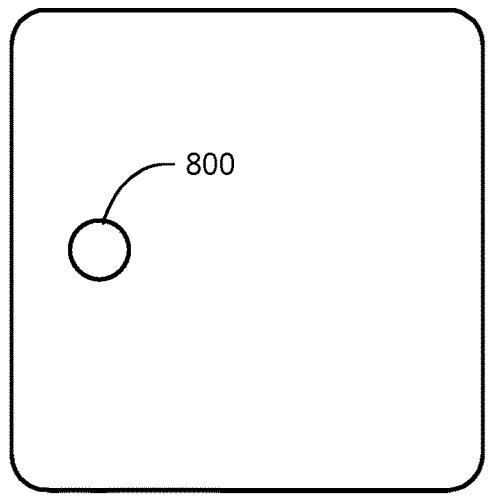
FIGS. 8A-8C show three views of another embodiment in which glass having variable levels of opacity is provided, wherein the opacity is electronically controlled.
Figure 8B:
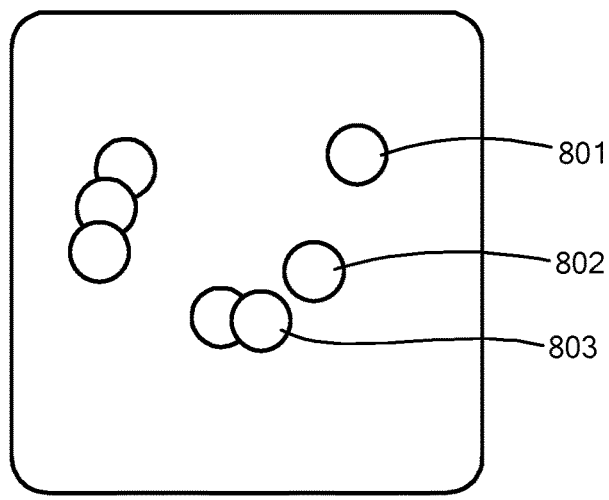
Figure 8C:
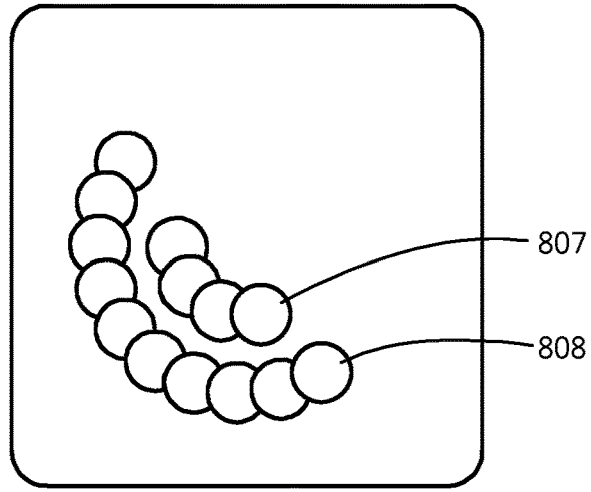

FIGS. 8A-8C depict another embodiment in which glass has variable levels of opacity, wherein the opacity is electronically controlled. For example, smart glass or switchable glass may be used wherein the light transmission properties are altered when a voltage, or heat are applied. In most configurations, the glass changes from translucent to transparent moving from blocking all wavelengths of light to letting light pass through. In the configuration shown, active shading or opening of the sensor input is provided for a multiple field-of-view camera system. Each of the desired openings has a separate electrical connection for changing the opacity of that opening. The configuration is actively controlled based upon sensor selection. As shown in FIG. 8A, only one opening 800 is created for allowing light to flow through. In FIG. 8B, a plurality of different openings are transmissive, including apertures 801, 802, 803. Finally, FIG. 8C shows a configuration similar to that FIG. 8A is an inner ring 807 and an outer ring 808. Thus, multiple camera sensors can be selected, and an electric voltage can be applied to the desired regions for changing the opacity of the glass.

Figure 9:
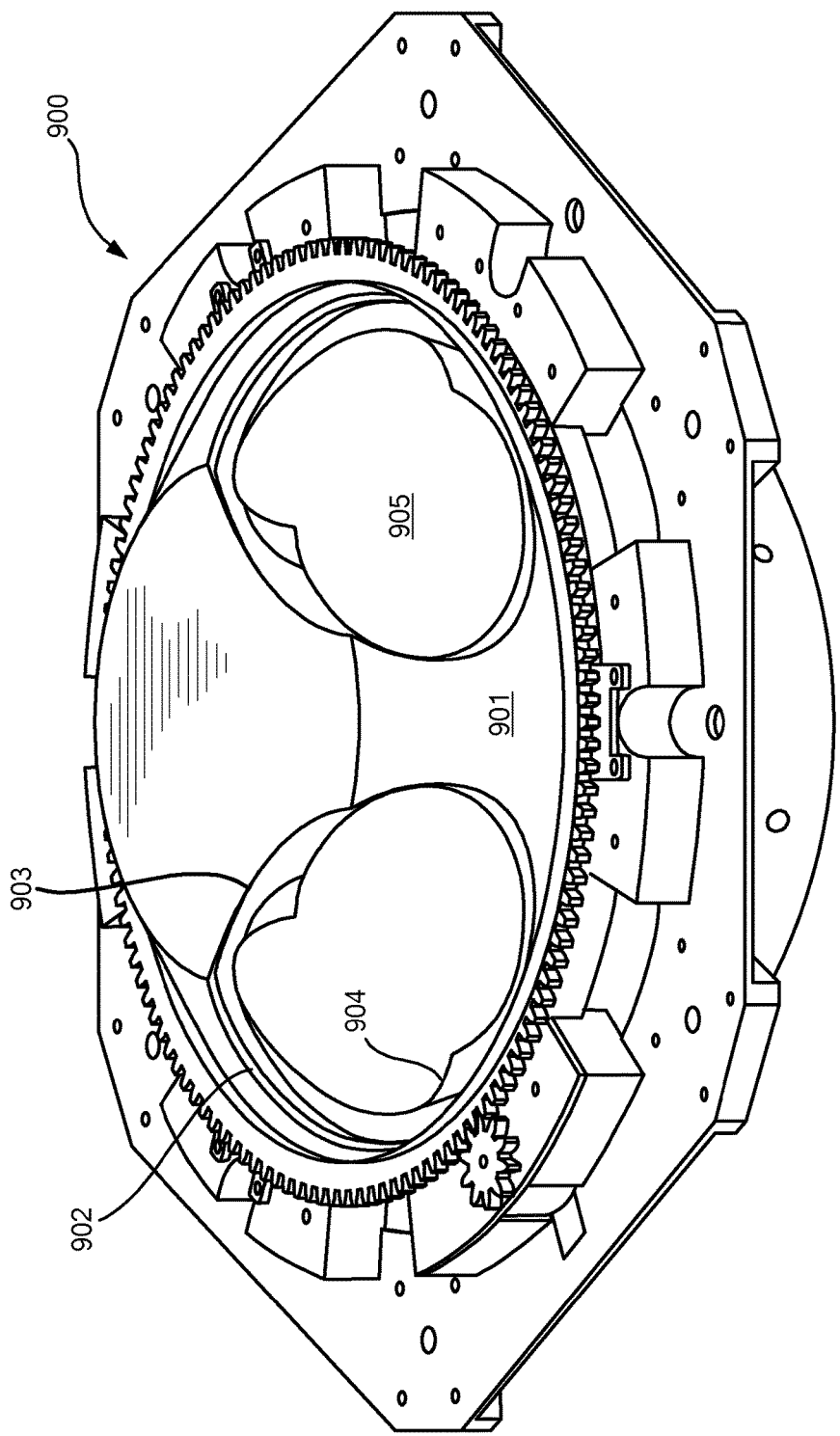
FIG. 9 shows a camera sensor array on a platform with a two part conical shape reconfigurable sunshade according to an embodiment of the present invention.

The foregoing examples are described in terms of two cylindrical sunshades, but it will be appreciated that the invention is not limited to that specific geometry and there are other specific sunshade shapes such as conical, flat and other shape geometries that can be used in other specific embodiments. For example, FIG. 9 shows an embodiment of a camera sunshade system 900 with a two part shape conical shape sunshade having an outer conical shape sunshade 901 and an inner conical shape sunshade 902. Both the outer sunshade 901 and the inner sunshade 902 have elliptical shape sensor apertures 903 and 904 respectively such that independent rotation of the outer sunshade 901 and the inner sunshade 902 can be controlled to align a pair of the apertures 903 and 904 over a selected pair of camera sensors (not shown). In the embodiment shown in FIG. 9, the inner apertures 904 are also covered by filters 905 that filter the incoming ambient light as desired, for example, polarizing filters, infrared or UV filters, etc.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

The present invention may be embodied in other specific forms without departing from the true scope of the invention. The described embodiments are to be considered in all respects only as illustrative and not restrictive.

What is claimed is:

1. A configurable sunshade for use with a multiple camera system including a fixed platform having a plurality of camera sensors attached thereto, each sensor having an associated field of view for receiving light from a scene, the sunshade comprising:

a first portion that is independently rotatable relative to the fixed platform and having open slots and shaded sections, the first portion positioned above the fixed platform;

a second portion layered below the first portion and above the fixed platform and independently rotatable relative to first portion, the second portion having open slots and shaded sections different from that of the first portion;

the first and second portions rotatable to a plurality of positions wherein in a first position all cameras are blocked from receiving light from the scene; in a second position a first set of cameras is blocked from receiving light from the scene and in a third position a second set of cameras different from the first set of cameras is blocked from receiving light from the scene.

2. The configurable sunshade according to claim 1, further comprising at least one bearing coupled to the first portion for rotating the first portion.

3. The configurable sunshade according to claim 2, further comprising at least one bearing coupled to the second portion for rotating the second portion.

4. The configurable sunshade according to claim 1, further comprising a controller for controlling the rotation of the first and second portions.

5. The configurable sunshade according to claim 4, further comprising a first motor coupled to the first portion capable of rotating the first portion in response to the controller.

6. The configurable sunshade according to claim 5, further comprising a second motor coupled to the second portion capable of rotating the second portion in response to the controller.

7. The configurable sunshade according to claim 1, wherein the first portion is cylindrical having a top and a side and wherein a portion of the open slots and shaded sections reside on the side of the cylinder.

8. The configurable sunshade according to claim 1, wherein the second portion is cylindrical having a top and a side and wherein a portion of the slots and shaded sections reside on the top of the cylinder.

9. The configurable sunshade according to claim 1, wherein the platform is circular.

10. The configurable sunshade according to claim 1, wherein in the first position, the first and second portions are configured to expose a selectable portion of at least one camera field of view for the scene.

11. The configurable sunshade according to claim 9, wherein in the second position the first and second portions are configured to expose a selectable portion of at least one camera field of view different from that in the first position.

12. The configurable sunshade according to claim 1, further comprising:
the plurality of camera sensors attached to the fixed platform.

13. The configurable sunshade according to claim 1, causing a first set of cameras to capture a first image when in a first position and adjusting the first and second portions so that a second set of cameras capture a second image.

14. A method of using a configurable sunshade, the configurable sunshade having a first portion and a second portion, the first and second portions residing above a fixed frame that includes a plurality of camera sensors, the second portion residing between the first portion and the fixed platform, the method comprising:

sending a first control signal from a controller to a motor for rotating the first portion of the sunshade to a desired position for exposing a field of view of one or more cameras, the first portion of the sunshade including open slots and shaded sections to either expose a field of view of at least one camera sensor residing on the fixed frame or for blocking the field of view of at least one camera sensor on the fixed frame; and sending a second control single from the controller to a motor for rotating the second portion of the sunshade to a desired position for exposing a field of view of one or more cameras, the second portion of the sunshade including open slots and shaded sections to either expose a field of view of at least one camera residing on the fixed frame or for blocking the field of view of at least one camera on the fixed frame.

15. The method according to claim 14, wherein the exposed field of view of the one or more cameras for the first portion is different from the exposed field of view of one or more cameras for the second portion.

16. The method according to claim 14, wherein the first portion rotates about a first bearing and the second portion rotates about a second bearing.

17. The method according to claim 14, wherein the first portion and the second portion include a plurality of steps for alignment of the first portion and the second portion.

18. The method according to claim 14, wherein the fixed frame is circular.

19. The method according to claim 14, wherein the first and second control signals cause the field of view of all of the cameras to be blocked.

20. The method according to claim 14, wherein a new first control signal is provided and a new second control signal is provided for repositioning the first portion and the second portion relative to the fixed frame and the camera sensors.

21. A method of exposing a selectable portion, less than all of a field of view of a set of cameras to a scene, the method comprising:

disposing a multi-part camera shade adjacent the set of cameras so that at least one camera is aimed toward an interior of the multi-part camera shade, the multi-part camera shade being configured to define apertures by electronic rotation of a first portion of the multi-part camera shade and by electronic rotation of a second portion of the multi-part camera shade such that the apertures defines the selectable portion less than all of the field of view of the at least one camera exposed to the scene; and under control of a processor, adjusting the position of the apertures by electronic rotation of the first part and the second part, such that the apertures are oriented toward the scene.

* * * * *

UNITED STATES PATENT AND TRADEMARK OFFICE
CERTIFICATE OF CORRECTION

PATENT NO. : 10,362,234 B2
APPLICATION NO. : 15/888327
DATED : July 23, 2019
INVENTOR(S) : Matthew T. Jamula et al.

Page 1 of 1

It is certified that error appears in the above-identified patent and that said Letters Patent is hereby corrected as shown below:

In the Claims

In Column 10, Line 9:
Replace "single"
With "signal"

Signed and Sealed this
Eighth Day of October, 2019

Andrei Iancu
*Director of the United States Patent and Trademark Office*